(12) United States Patent
Wright et al.

(10) Patent No.: US 8,594,284 B2
(45) Date of Patent: *Nov. 26, 2013

(54) SYSTEMS AND METHODS FOR PROVIDING CONTEXT-BASED VOICEMAIL

(71) Applicant: AT&T Mobility II LLC, Atlanta, GA (US)

(72) Inventors: Joshua S. Wright, Atlanta, GA (US); Linda S. Giles, Powder Springs, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,163

(22) Filed: Jan. 30, 2013

(65) Prior Publication Data

US 2013/0150003 A1  Jun. 13, 2013

Related U.S. Application Data

(63) Continuation of application No. 13/305,217, filed on Nov. 28, 2011, now Pat. No. 8,374,318, which is a continuation of application No. 11/772,974, filed on Jul. 3, 2007, now Pat. No. 8,077,837.

(51) Int. Cl.
*H04M 1/64* (2006.01)
*H04L 12/58* (2006.01)

(52) U.S. Cl.
USPC .................................. 379/88.12; 455/412.1

(58) Field of Classification Search
USPC ........... 379/76, 88.01–88.25, 142.01–142.08, 379/201.1; 455/404.1, 414.1, 413, 415
See application file for complete search history.

(56) References Cited

U.S. PATENT DOCUMENTS

| | | | |
|---|---|---|---|
| 7,542,552 B2 | 6/2009 | Korah et al. | |
| 7,599,473 B2 | 10/2009 | Michael et al. | |
| 7,623,633 B2 | 11/2009 | Gatzke et al. | |
| 7,688,954 B2 * | 3/2010 | Gatzke et al. | 379/88.21 |
| 7,813,483 B2 | 10/2010 | Gatzke et al. | |
| 8,265,239 B2 * | 9/2012 | Narayan et al. | 379/88.19 |
| 8,401,157 B2 * | 3/2013 | Bushnell et al. | 379/88.17 |
| 2006/0031326 A1 | 2/2006 | Ovenden | |
| 2008/0005681 A1 * | 1/2008 | Cohen et al. | 715/762 |
| 2010/0100387 A1 * | 4/2010 | Kuiken et al. | 704/270 |
| 2010/0159890 A1 * | 6/2010 | Sigmund et al. | 455/413 |
| 2010/0215157 A1 * | 8/2010 | Narayan et al. | 379/88.19 |
| 2010/0273443 A1 * | 10/2010 | Forutanpour et al. | 455/404.1 |

* cited by examiner

*Primary Examiner* — Mohammad Islam
(74) *Attorney, Agent, or Firm* — Parks IP Law LLC; Mickki D. Murray, Esq.

(57) ABSTRACT

Voicemail systems and methods for managing voicemail systems are provided herein. The subject voicemail systems provide a plurality voicemail greeting, each of which are associated with a context tag. The context tag can be, for example, a location, a device parameter, an account parameter, a network parameter, or any other contextual information. Upon receipt of a change in a context tag, the voicemail system determines a new voicemail greeting associated with the new context tag and sets the new voicemail greeting to the active voicemail greeting.

19 Claims, 11 Drawing Sheets

Voicemail Account 300

| Location 302 | Device Parameter 304 | Account Parameter 306 | Greeting 308 |
|---|---|---|---|
| Atlanta (Home) | Battery Level | Remaining Minutes | Greeting 1 |
| New York (Work) | Signal Strength | Data Limit | Greeting 2 |
| Chicago (Vacation) | | | Greeting 3 |
| Venue | . | . | Greeting 4 |
| International (Work) | . | . | Greeting 5 |
| . | Device Parameter N | Account Parameter N | |
| . | | | |
| Location N | | | Greeting N |

*FIG. 3*

SYSTEMS AND METHODS FOR PROVIDING CONTEXT-BASED VOICEMAIL

CROSS REFERENCE TO RELATED APPLICATION

This application is a continuation of U.S. application Ser. No. 11/772,974, filed Jul. 3, 2007, the entirety of which is herein incorporated by reference.

TECHNICAL FIELD

The present invention relates generally to voicemail systems and, more particularly, to the field of voicemail systems with multiple voicemail greetings.

BACKGROUND OF THE INVENTION

Voicemail systems allow a caller to leave a voice message if the desired recipient is unavailable. Past voicemail systems provided one voicemail greeting to be played for every caller, regardless of the identity of the caller. In this system type, all callers would receive the same voicemail greeting. Accordingly, it was desirable to design and build improved voicemail systems capable of maintaining multiple voicemail greetings and assigning each greeting to one or more callers based upon the identity of the caller as determined by the caller's telephone number.

Although improved voicemail systems are beneficial in targeting specific calling parties, they are deficient in providing multiple greetings based on the context of the recipient. Contextual factors such as the recipient's location, device characteristics, account characteristics and the like change from time to time and are telling of the recipient's availability. Accordingly, the recipient's availability changes, often times unexpectedly. In these situations, the recipient may miss or be forced to ignore an important call and the calling party may become disgruntled that the recipient did not answer.

Notwithstanding the respective improvements in the aforementioned systems, the industry has not yet turned its attention to new voicemail systems and novel methods for managing voicemail systems that allow multiple voicemail greetings to be presented to incoming callers based upon the present context of the recipient. This and other aspects of the present invention will become readily apparent from the description provided herein.

SUMMARY OF THE INVENTION

One aspect of the present invention employs a voicemail system that includes at least one voicemail account. Each voicemail account is associated with a plurality of voicemail greetings, and at least one context tag is associated with the voicemail greetings. The context tag can be a location identifier, a device parameter, a network parameter, an account parameter, or any other contextual information, for example.

In another aspect of the invention, a method of managing the above voicemail system includes receiving a first context tag; determining a first voicemail greeting associated with the first context tag; and setting the first voicemail greeting as the active voicemail greeting. The method can further include receiving an unanswered call, and presenting the first voicemail greeting to the calling party in response to the unanswered call. The method can still further include receiving a notification with a second context tag; determining a second voicemail greeting associated with the second context tag; and setting the second voicemail greeting as the active voicemail greeting. The second voicemail greeting would then be presented to the calling party in response to an unanswered call. The context tag and associated voicemail greeting can be changed any number of times as the voicemail recipient's context changes. A computer-readable medium, comprising computer-executable instructions that, when executed, perform the steps of the above method is also disclosed.

In another aspect of the invention, an exemplary system for managing context-based voicemail includes at least one context device capable of receiving subscriber identification from a mobile terminal via a short-range communication medium and a context server in communication with the context device, wherein the context server is capable of receiving the subscriber identification from the context device. Context information can be stored in a memory of either or both of the context device or the context server. A voicemail system is in communication with the context server. The voicemail system includes a plurality of voicemail accounts, at least one of which can include a plurality of voicemail greetings corresponding to a plurality of context information types. The voicemail system is configured to receive the subscriber identification and the context information, determine the context information type of the context information, determine the voicemail greeting corresponding to the determined context information type, and set the determined voicemail greeting to the active voicemail greeting for the voicemail account associated with the subscriber identification.

In one embodiment, the context information includes a primary location of a venue, such as, for example, a name and/or address of the venue. In another embodiment the context information additionally includes a secondary location of a venue, such as, for example, a destination within the venue. In yet another embodiment, the context information can include at least one of a date, time, and length of an event at the venue.

In another aspect of the present invention, a voicemail system includes a processor and a memory. The memory includes a plurality of voicemail accounts and a voicemail greeting database, wherein the voicemail greeting database includes a plurality of voicemail greetings corresponding to the context tags. The context tags are associated with a plurality of context information types, such as, for example, a location, a device parameter, a network parameter, and an account parameter.

In yet another aspect of the present invention, a computer program is provided for receiving a notification informing a user of the availability of a new voicemail greeting in response to a context tag change in a voicemail system. The notification is displayed on a display of the mobile terminal and may accompany a prompt to determine whether the user would like to accept active the new voicemail greeting. This functionality may alternatively be automatic and the notification would be sent without a prompt.

In another aspect of the present invention, a method for managing context-based voicemail includes receiving subscriber identification from a mobile terminal at a context device via a short-range communication medium; creating a message at the context device or a context server, wherein the message includes the subscriber identification and context information; and sending the message from the context server to a voicemail system, the voicemail system including a plurality of voicemail accounts, at least one of the voicemail accounts including a plurality of voicemail greetings corresponding to a plurality of context information types; receiving the message at the voicemail system; determining the context information type of the context information; determining the voicemail greeting corresponding to the determined context information type; and setting the determined voicemail greeting to the active voicemail greeting for the voicemail account associated with the subscriber identification.

BRIEF DESCRIPTION OF THE DRAWINGS

FIG. 3 illustrates an exemplary voicemail account configured with a plurality of voicemail greetings, each being associated with a context tag, according to the present invention.

DETAILED DESCRIPTION OF THE INVENTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
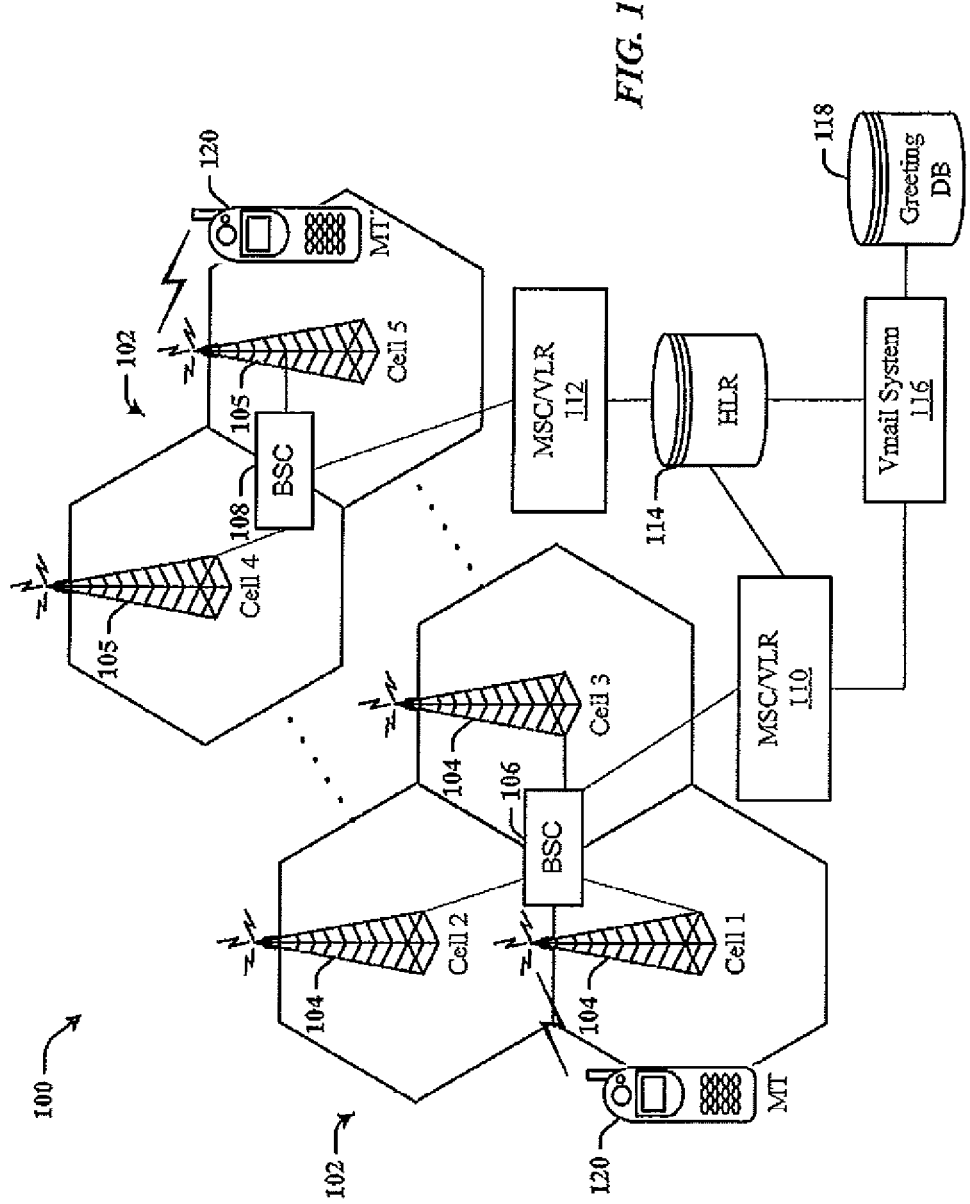
FIG. 1 illustrates an exemplary environment in which the present invention may be practiced.

Referring now to the drawings wherein like numerals represent like elements throughout the several views, FIG. 1 illustrates an exemplary telecommunications network 100. The network 100 includes a plurality of cells 102 that can form distinct location areas. For example, a first location area (LA1) can include cells 1-3 and a second location area (LA2) can include cells 4 and 5. The location areas are assigned location area identities (LAI). A LAI includes a mobile country code (MCC), mobile network code (MNC), and location area code (LAC) that define the country, network, and location area, respectively. A location area is typically defined by the network operator as one or more cells and is used for handover processes, among others.

The present invention utilizes context tags to change a voicemail greeting based upon the voicemail recipient's context, such as, for example, their location, device characteristics, account characteristics, network characteristics, and the like. In one embodiment, one or more LAIs are used as the context tag. For example, LA1 can correspond to one context tag and LA2 can correspond to another context tag. Accordingly, when the recipient is in communication with a cell in LA1, the voicemail greeting associated with the context tag that includes LA1 would be presented to a calling party in response to an unanswered call. Likewise, if the recipient travels to LA2 the voicemail greeting associated with the context tag that includes LA2 would be presented to a calling party in response to an unanswered call.

The recipient can request that a certain voicemail greeting be played for a particular location area; however, the recipient may not be privy to the actual location area or corresponding LAI. In such a case, the recipient may designate a location based upon a city, town, county, state, region, country, or continent. The recipient can designate the location with a unique identifier for the location, such as a name of the location or a numeric identifier, for example. By way of example and not limitation, the numeric identifier may be a zip code, an area code, or a proprietary numeric identifier defined for this use. Alphanumeric identifiers may alternatively be used. The unique identifier would then be correlated to the appropriate LAI(s) such that the network could determine the appropriate voicemail greeting for the corresponding locations.

The recipient can establish the locations for each voicemail greeting via a voicemail system interface. The voicemail system interface may be accessed, for example, from the user's handset, by a phone call to the voicemail system, via a website, or via a call center.

Each cell within the illustrated location areas includes a base station (BS) 104, 105 that is in communication with a respective base station controller (BSC) 106, 108. Each BSC 106,108, in turn, is in communication with a respective mobile switching center (MSC) 110, 112. The MSCs 110, 112 can include the functionality of a visiting location register (VLR). The MSCs 110, 112 are in communication with a home location register (HLR) 114 and a voicemail system 116. The voicemail system 116 is in communication with a greeting database 118.

The voicemail system 116 can be configured with a processor and memory to perform typical voicemail operations in addition to the novel operations described herein. In one embodiment, the voicemail system 116 is configured to correlate a context tag with the greeting database 118 to determine the active voicemail greeting(s).

The illustrated network 100 also includes a mobile terminal (MT) 120. The MT 120 is illustrated as being in communication with the BS 104 of cell 1. A context tag in the form of a location tag is provided to the voicemail system 116. The voicemail system 116 uses the location tag to determine which voicemail greeting should be used for an unanswered call while the MT 120 is positioned in cell 1, or more broadly LA1. As the MT 120 moves from LA1 to LA2 a location update is performed. Accompanying the location update is the context tag that the MSC/VLR 110, 112 and/or voicemail system 116 uses to determine the new active voicemail greeting. The repositioned MT 120 is illustrated as MT'.

In one embodiment, the MSC/VLR 110, 112 is updated with a new location via a location update process. This information can then be sent to the voicemail system 116, wherein the voicemail system 116 can determine if the active voicemail greeting should be changed based upon the LAI of the new location. In this embodiment the context tag is the LAI. The context tag is correlated with the voicemail greetings database 118 to determine the corresponding voicemail greeting(s). Multiple voicemail greetings can be used such that the voicemail greeting is dependent upon both the identity of the calling party and the context of the recipient.

In another embodiment, the MSC/VLR 110, 112 can receive the new location in terms of the LAI and convert this information to one or more unique location identifiers related to that LAI. This allows the voicemail system 116 to receive the location identifier and correlate directly with the voicemail greetings database 118 to determine the proper voicemail greeting. This eliminates the need for the voicemail system 116 to be exposed to the LAIs of the network. As such, the MSC/VLR 110, 112 may include a processor and memory configuration so as to support additional processing and storage functions required to convert an LAI to the corresponding location identifiers. For example, suppose LA1 corresponds to Atlanta, Ga. and LA2 corresponds to New York City, N.Y. The MSC/VLR 110, 112 would convert the LAI for LA1 and LA2 to the location identifier used for Atlanta, Ga. and New York City, N.Y., respectively. In this embodiment, the context tag is the unique location identifier.

Other location determining techniques, for example, global positioning system (GPS), assisted-GPS (A-GPS), triangulation, proximity MSC, and the like may alternatively be used to determine the location of the MT 120 and consequently the voicemail greeting for that location.

Figure 2:
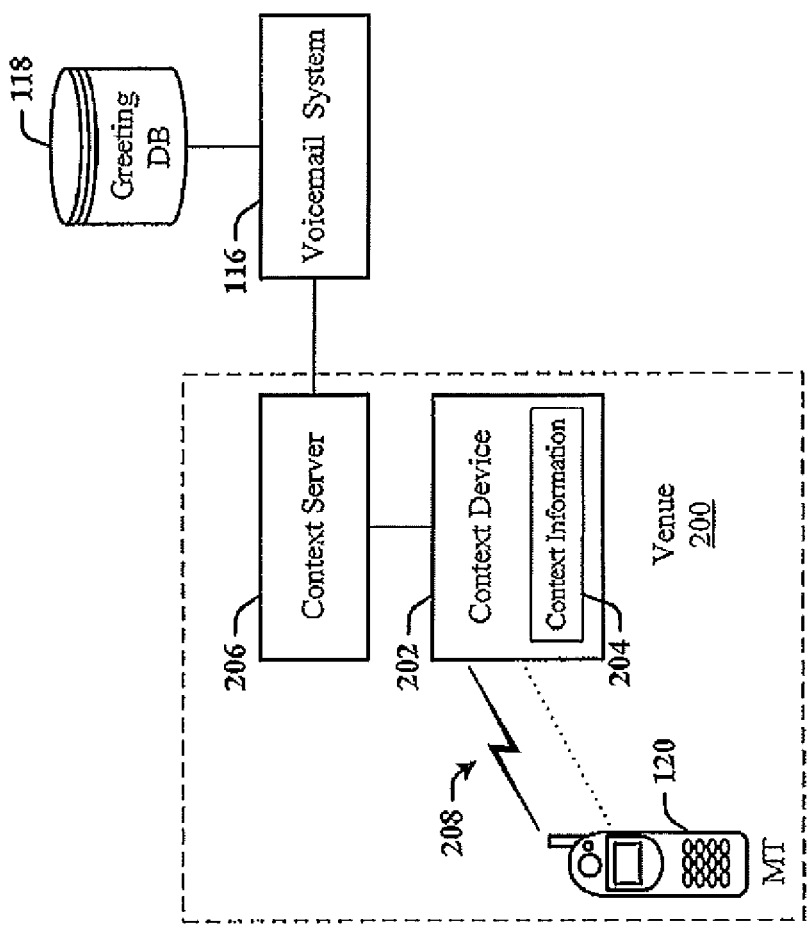
FIG. 2 illustrates another exemplary environment in which the present invention may be practiced.

Referring now to FIG. 2, a venue 200 is illustrated. The venue includes a context device 202. The context device 202 can be configured with a processor and memory configuration to process and store context information 204. The context information 204 can include the venue name and location. The context information 204 can also include more particular information. For example, if the venue 200 is a movie theatre, the context device 202 may be positioned near the entryway of a particular movie screen. In this example, the context information 204 can include the movie title, start time, running time, and end time. This context information 202 can be supplied to a context server 206 that is in communication with the voicemail system 116 and the greeting database 118. The context server 206 may receive all context information 204 from the context device 202 or may append additional context information, such as the name and location of the example movie theatre. The context server 206 can be in communication with the voicemail system 116 via the cellular network, the public switched telephone network, or the Internet, for example.

The MT 120 is illustrated as being in communication with the context device 202 via a short-range communication medium 208, for example, near field communication, BLUETOOTH®, Wi-Fi®, infrared, infrared data association (IrDA®, ZigBee®, radio frequency identification (RFID), contactless smart cards, and the like. In one embodiment, when the MT 120 is within range of the context device 202, the MT 120 can communicate subscriber identification information, for example, an International Mobile Subscriber Identity (IMSI) or a Temporary International Mobile Subscriber Identity (T-IMSI). For security reasons, the T-IMSI may be more appropriate. In either case, the IMSI/T-IMSI supplies the context device with subscriber identification information that is used to correlate with a subscriber's voicemail account.

In the above embodiment, the context information 204 is relayed to the voicemail system 116 without the MT 120. However, a second exemplary embodiment may utilize the MT 120 to send the context information 204 to voicemail system 116. In this embodiment, the MT 120 receives the context information 204 from the context device 202 when the MT 120 is within range and given that the MT 120 is configured to receive such information and, sends the context information 204 to the voicemail system 116. The MT 120 may include software for managing the receive/send functions of context information 204 from various sources (e.g., context device 202).

Referring now to FIG. 3a, an exemplary voicemail account 300 is illustrated. The voicemail account 300 includes a location field 302, a device parameter field 304, an account parameter field 306, and a greeting field 308. As described with reference to FIG. 1 and FIG. 2, the location field 302 can include location information retrieved from LAIs, GPS coordinates, a context device 202, or other location determining techniques. The illustrated location field 302 includes entries for Atlanta, New York, Chicago, Venue, and International. Any number of location entries may be established for a voicemail account.

In the illustrated example, the Atlanta entry corresponds to a subscriber's home location. This may be defined, for example, by the LAIs associated with Atlanta. This may be extended to the entire state of Georgia, Georgia and one or more surrounding states, the entire southeast United States, or any other location as defined by the subscriber or the network operator for this context (location) tag.

The New York entry corresponds to one of the subscriber's work locations. Again, this may be defined by the LAIs associated with New York and, in some cases, the surrounding areas. The Chicago entry corresponds to the subscriber's vacation location, the Venue entry can be a movie theatre or other venue the subscriber visits, and the International entry can be a second work location for the subscriber. Each of these locations corresponds to different greetings, as shown in the greeting field 308. So, when the subscriber changes location from, for example, Atlanta to Chicago the active voicemail greeting would change from Greeting 1 to Greeting 3.

The device parameter field 304 includes device parameters that can be used to change the active greeting, Two example entries, battery life and signal strength are shown. These parameters can include threshold values such that if the battery life or signal strength of the MT is equal to or below the specified threshold value then the active voicemail greeting is changed to the corresponding voicemail greeting for that condition. Other device parameters can be used.

The account parameter field 306 includes account parameters that can be used to change the active greeting. Two example entries, remaining voice minutes and data limit are shown, These parameters use details of the subscriber's account to change the active voicemail greeting. These parameters can include threshold values such that if the number of voice or data minutes allotted for a subscriber's plan is equal to or below the specified threshold value then the active voicemail greeting is changed to the corresponding voicemail greeting for that condition. Other account parameters can be used.

The examples presented above are merely exemplary of the possible context information that can be used to change the active greeting of the voicemail account 300. Other context information can be stored in the voicemail account and associated with one or more greetings.

The greetings field 308 contains multiple voicemail greetings associated with the voicemail account 300. The voicemail greetings can be generic or customizable by the user or by the network. A generic voicemail greeting can be used to generally describe the current context of the voicemail recipient to a calling party. For example, if the recipient visits a venue, then the generic voicemail greeting can state that the recipient cannot receive calls now because they are at a venue. The network, however, may provide a more detailed customized voicemail greeting for such a scenario, The customized greeting can state that the recipient cannot receive calls now because they are at a movie theatre. More particular information such as the movie theatre name, the movie the recipient is there to see, and the end time for the movie can also be embedded in the customized voice message. Of particular note here is that the user/recipient does not have to record a voice message for each context, instead, the network is capable of embedding context information into generic voicemail messages.

The recipient can, however, record custom messages for various context environments that recipient frequents. For example, if a recipient travels from a home location in Atlanta to a work location in New York, the recipient may desire to record customized messages for those scenarios. The places, venues, or situations that occur less frequently can be assigned generic voicemail message or customizable network messages. Context information can be embedded in a user-customized message as well.

Figure 4:
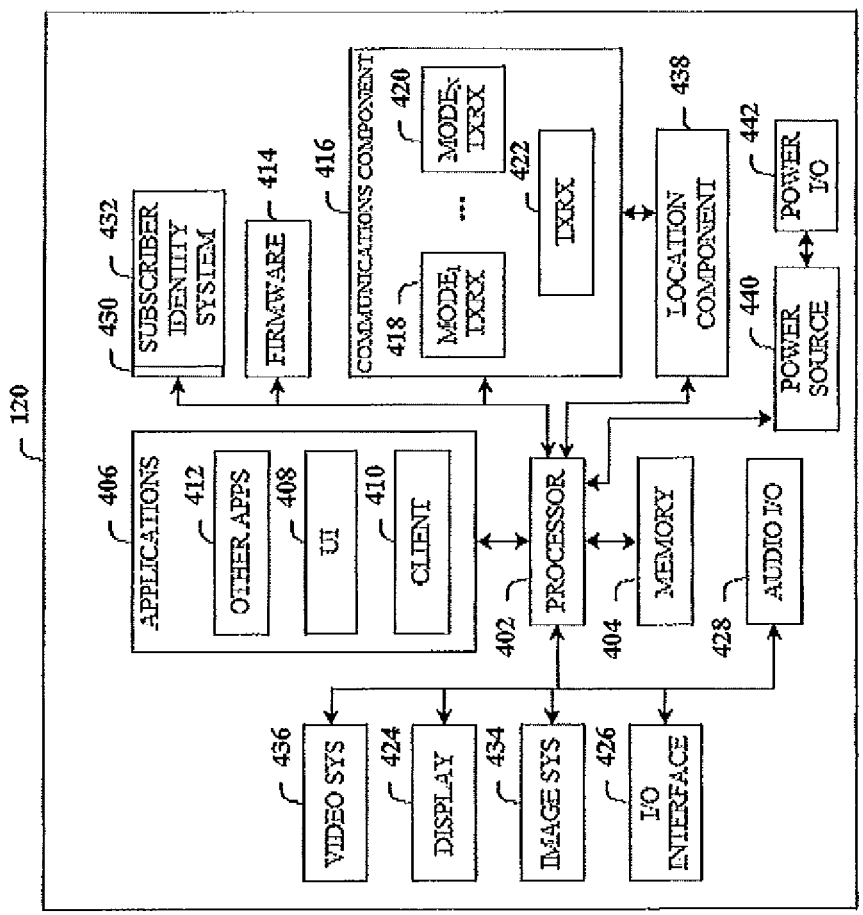
FIG. 4 illustrates an exemplary mobile device, according to the present invention.

Referring now to FIG. 4, a schematic block diagram of an exemplary multimode handset 120 is illustrated in accordance with an innovative aspect. In order to provide additional context for various aspects thereof, FIG. 4 and the following discussion are intended to provide a brief, general description of a suitable environment in which the various aspects of the innovation can be implemented. While the description includes a general context of computer-executable instructions, the present invention can also be implemented in combination with other program modules and/or as a combination of hardware and software.

Generally, applications (e.g., program modules) can include routines, programs, components, data structures, etc., that perform particular tasks or implement particular abstract data types. Moreover, the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 120 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the handset systems.

The handset 120 includes a processor 402 for controlling and processing onboard operations and functions. A memory 404 interfaces to the processor 402 for the storage of data and one or more applications 406 (e.g., a video player software, user feedback component software, etc.). The applications 406 can also include a user interface (UI) application 408 that operates with a client 410 (e.g., operating system) to facilitate user interaction with handset functionality and data, for example, answering/initiating calls, entering/deleting data, configuring settings, address book manipulation, multimode interaction, etc. The applications 406 can include other applications 412 installed with the handset 406 and/or installed as add-ons or plug-ins to the client 410 and/or UI 408, for example, or for other purposes (e.g., processor, firmware, etc.).

The other applications 412 can include voice recognition of predetermined voice commands that facilitate user control, call voice processing, voice recording, messaging, e-mail processing, video processing, image processing, music play, as well as subsystems or components described infra. Some of the applications 406 can be stored in the memory 404 and/or in a firmware 414, and executed by the processor 402 from either or both the memory 404 and/or the firmware 414. The firmware 414 can also store code for execution in power-up initialization and control during normal operation of the handset 120.

A communications component 416 can interface to the processor 402 to facilitate wired/wireless communications with external systems, for example, cellular networks, VoIP (voice-over-IP) networks, local wireless networks or personal wireless networks such as Wi-Fi, Wi-Max, and so on. Here, the communications component 416 can also include a multimode communications subsystem for providing cellular communications via different cellular technologies. For example, a first cellular transceiver 418 (e.g., GSM) can be one mode and an Nth transceiver 420 can provide cellular communications via an Nth cellular network (e.g., UMTS), where N is a positive integer. The communications component 416 can also include a transceiver 422 for unlicensed communications (e.g., Wi-Fi, Wi-Max, Bluetooth, etc.) for corresponding communications. The communications component 416 can also facilitate communications reception from terrestrial radio networks (e.g., broadcast), digital satellite radio networks, and Internet-based radio services networks.

The handset 120 can process IP data traffic via the communications component 416 to accommodate IP traffic from an IP network such as, for example, the Internet, a corporate intranet, a home broadband network, a personal area network, etc., via an ISP broadband cable provider. Thus, VoIP traffic can be utilized by the handset 120 and IP-based multimedia content can be received in an encoded and/or decoded format.

The handset 120 includes a display 424 for displaying multimedia that include text, images, video, telephony functions (e.g., a Caller ID function), setup functions, menus, etc. The display 424 can also accommodate the presentation of multimedia content (e.g., music metadata, messages, wallpaper, graphics, etc.).

An input/output (I/O) interface 426 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 426 can be utilized for updating and/or troubleshooting the handset 120, for example.

Audio capabilities can be provided via an audio I/O component 428, which can include a speaker for the output of audio signals related to, for example, indication that the user pressed the proper key or key combination to initiate the user feedback signal, call signals, music, etc. The audio I/O component 428 also facilitates the input of audio signals via a microphone to record data and/or telephony voice data, and for inputting voice signals for telephone conversations.

The handset 120 can include a slot interface 430 for accommodating a subscriber identity system 432 that can accommodate a SIM or universal SIM (USIM), and interfacing the subscriber identity system 432 with the processor 402. However, it is to be appreciated that the subscriber identity system 432 can be manufactured into the handset 120, and updated by downloading data and software thereinto.

An image capture and processing system 434 (e.g., a camera) can be provided for decoding encoded image content. Additionally, as indicated, photos can be obtained via an associated image capture subsystem of the image system 434.

The handset 120 can also include a video component 436 for processing video content received and, for recording and transmitting video content.

Optionally, a geolocation component 438 (e.g., GPS-global positioning system) facilitates receiving geolocation signals (e.g., from satellites via the communications component 416) that define the location of the handset 120. Alternatively, or in combination therewith, the geolocation component 438 can facilitate triangulation processing for locating the handset 120.

The handset 120 also includes a power source 440 in the form of batteries and/or an AC power subsystem, which power source 440 can interface to an external power system or charging equipment (not shown) via a power I/O component 442.

Figure 5:
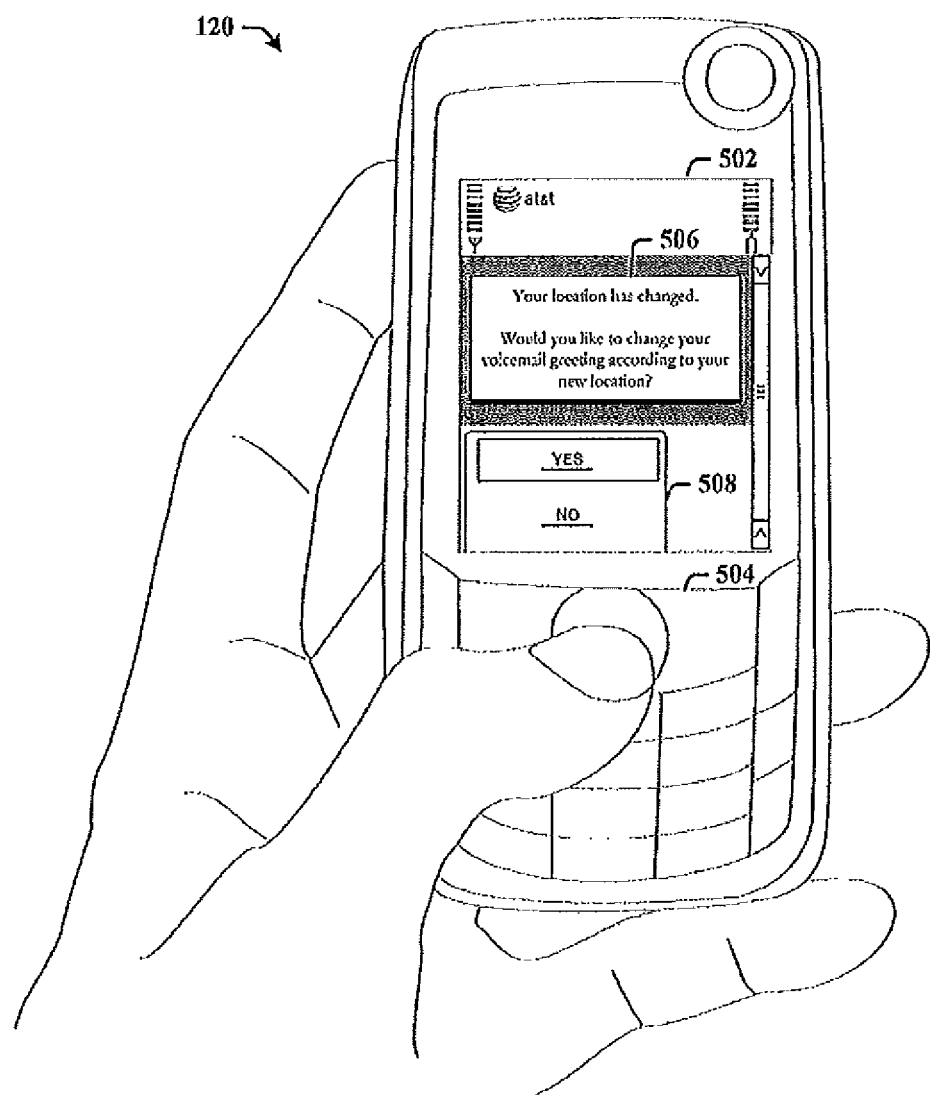
FIGS. 5-10 illustrate various notifications and settings corresponding to features of the present invention.

Referring now to FIG. 5, an exemplary MT 120 is illustrated. The illustrated MT 120 includes a display 502 such as a liquid crystal display (LCD) on which a location change notification 506 is illustrated. The location change notification 506 informs the user that their location has changed and a voicemail greeting corresponding to their new location is available. The user is presented with an options menu 508 with options for Yes and No. The user can select either option via a keypad 504.

Figure 6:
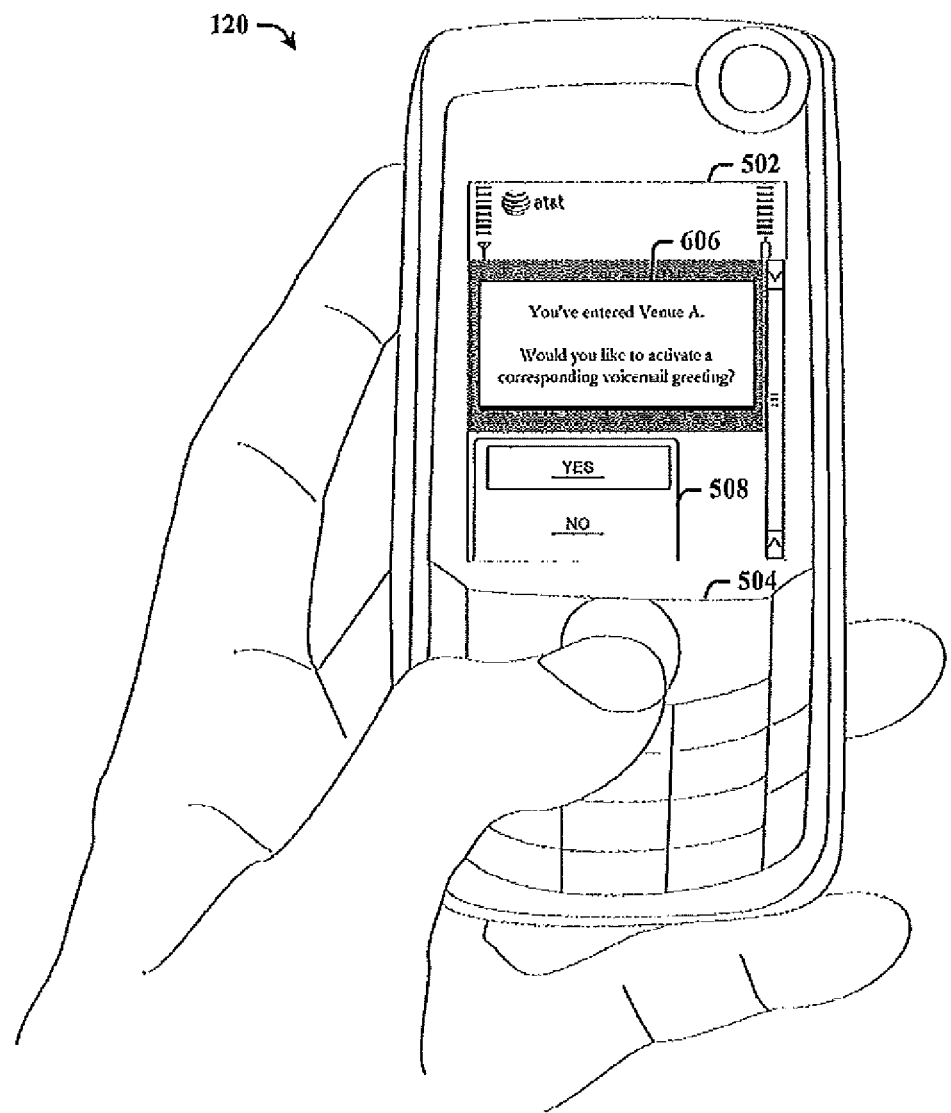

Referring now to FIG. 6, the exemplary MT 120 is again illustrated, however, in this embodiment the notification is a venue change notification 606. The venue change notification 606 informs the user that their venue location has changed and a voicemail greeting corresponding to their new venue location is available.

Figure 7:
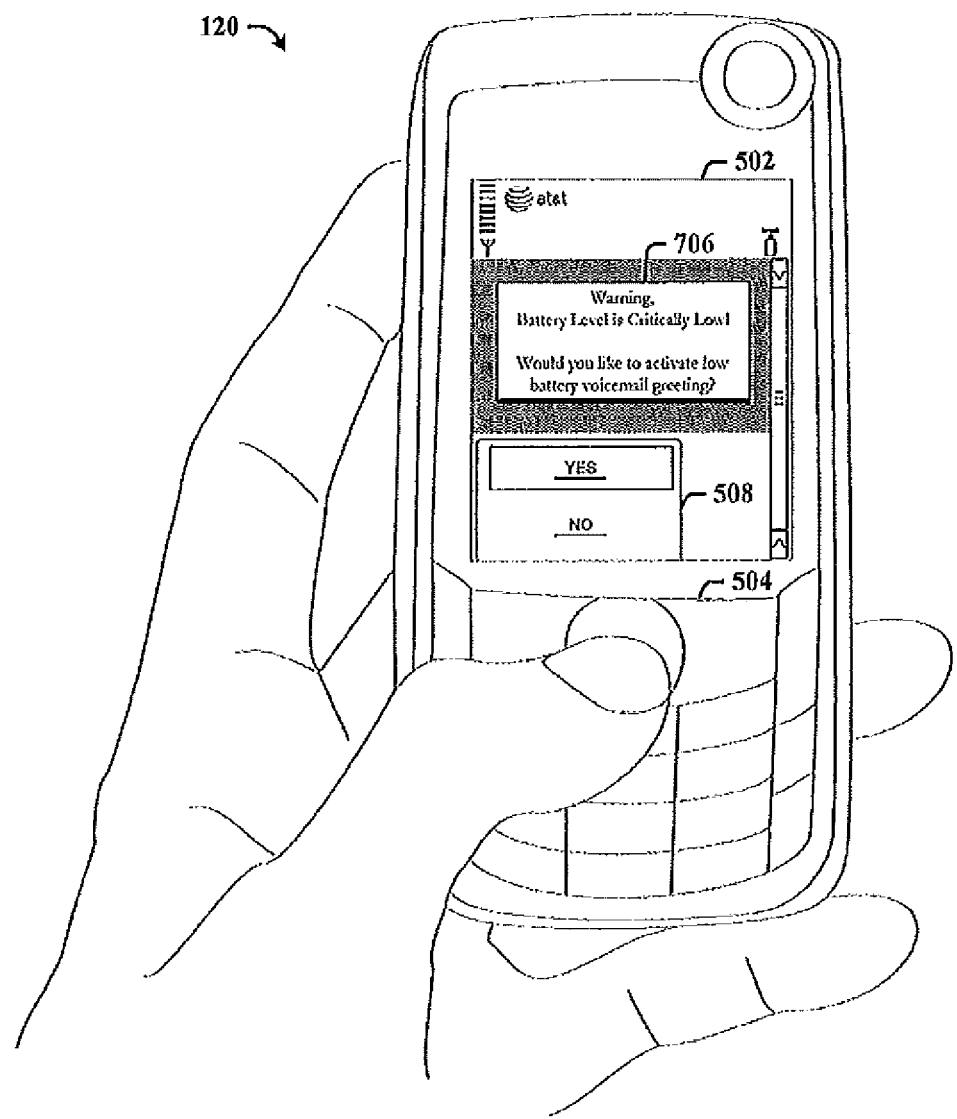

Referring now to FIG. 7, the exemplary MT 120 is again illustrated, however, in this embodiment the notification is a battery level notification 706. The battery level notification 706 informs the user that their device battery level has changed below the specified threshold level and a voicemail greeting corresponding to the low battery status is available.

Figure 8:
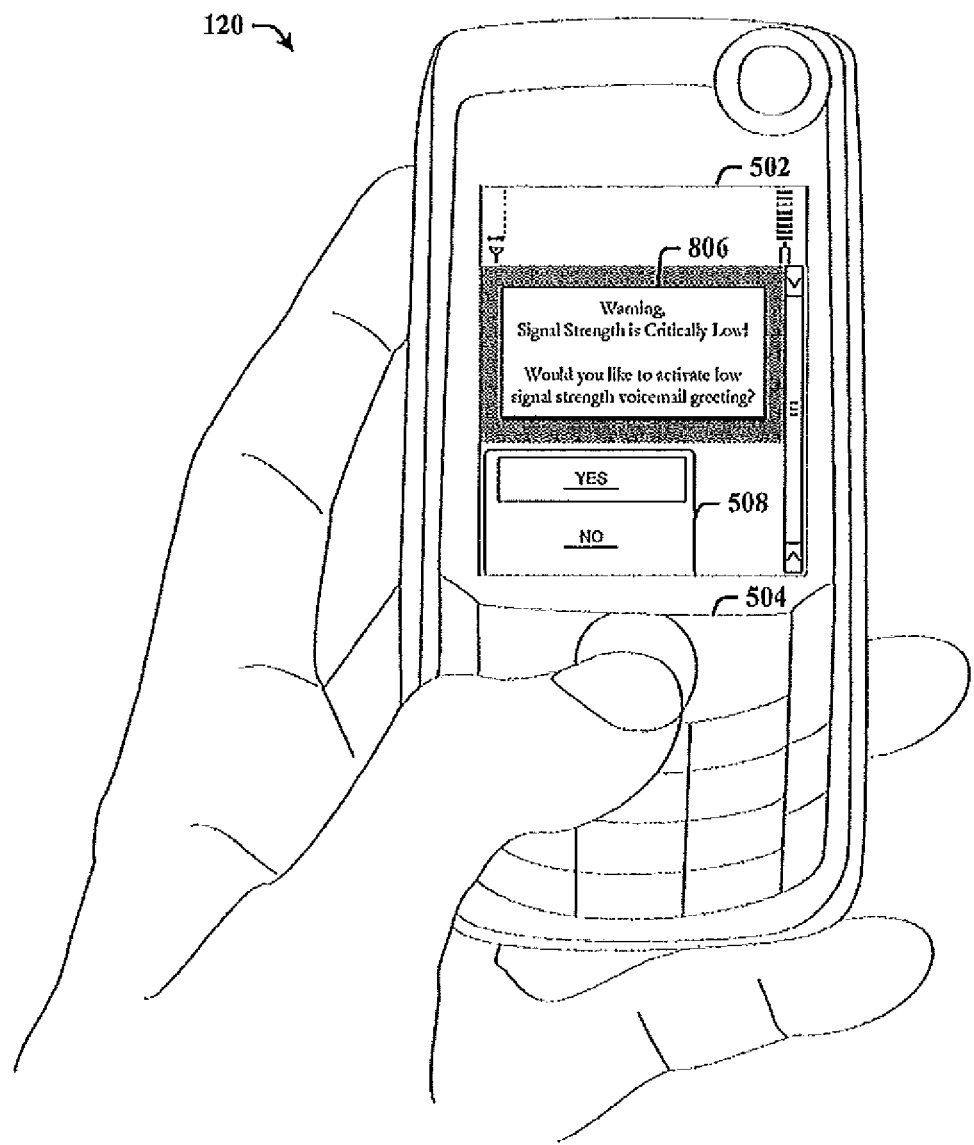

Referring now to FIG. 8, the exemplary MT 120 is again illustrated, however, in this embodiment the notification is a low signal strength notification 806. The low signal strength notification 806 informs the user that their signal strength has changed below the specified threshold level and a voicemail greeting corresponding to the low signal strength status is available.

Figure 9:
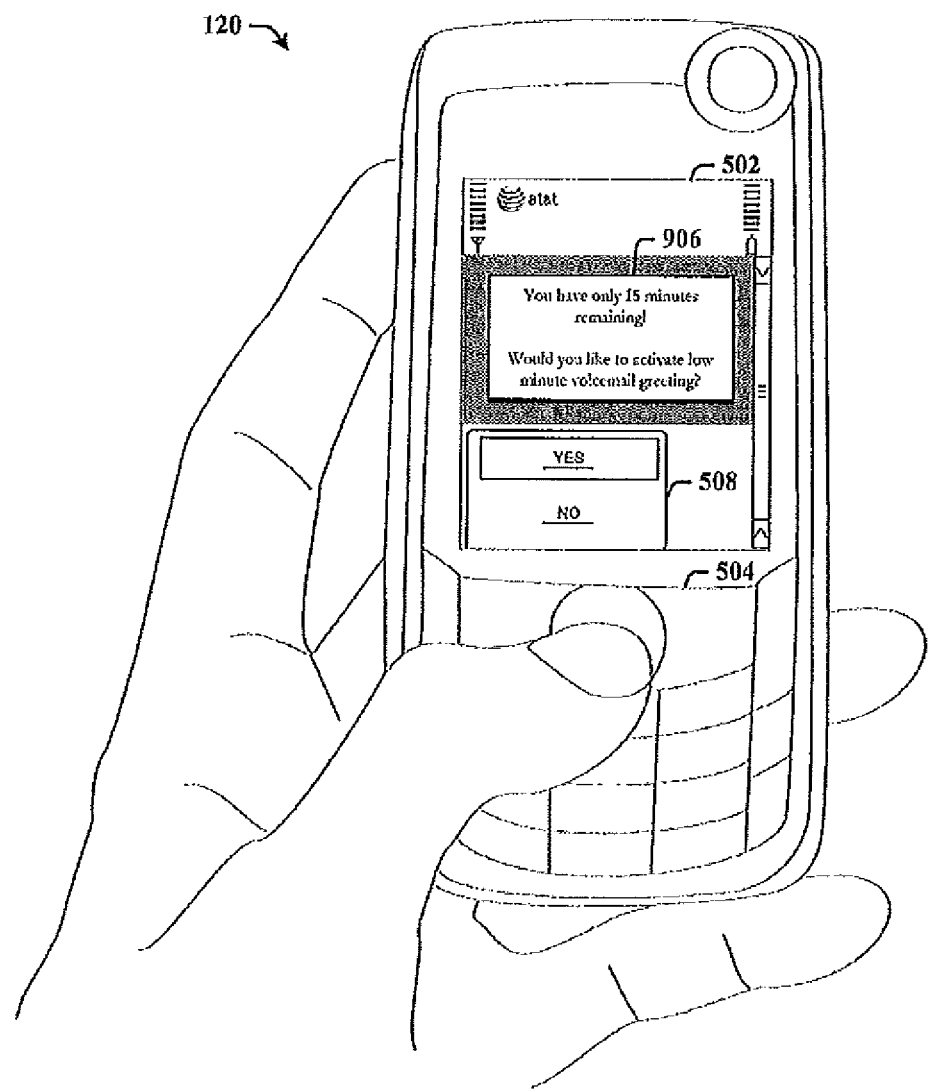

Referring now to FIG. 9, the exemplary MT 120 is again illustrated, however, in this embodiment the notification is a low minute notification 906. The low minute notification 906 informs the user that their subscription minutes are below the specified threshold level and a voicemail greeting corresponding to the low minute status is available.

Figure 10:
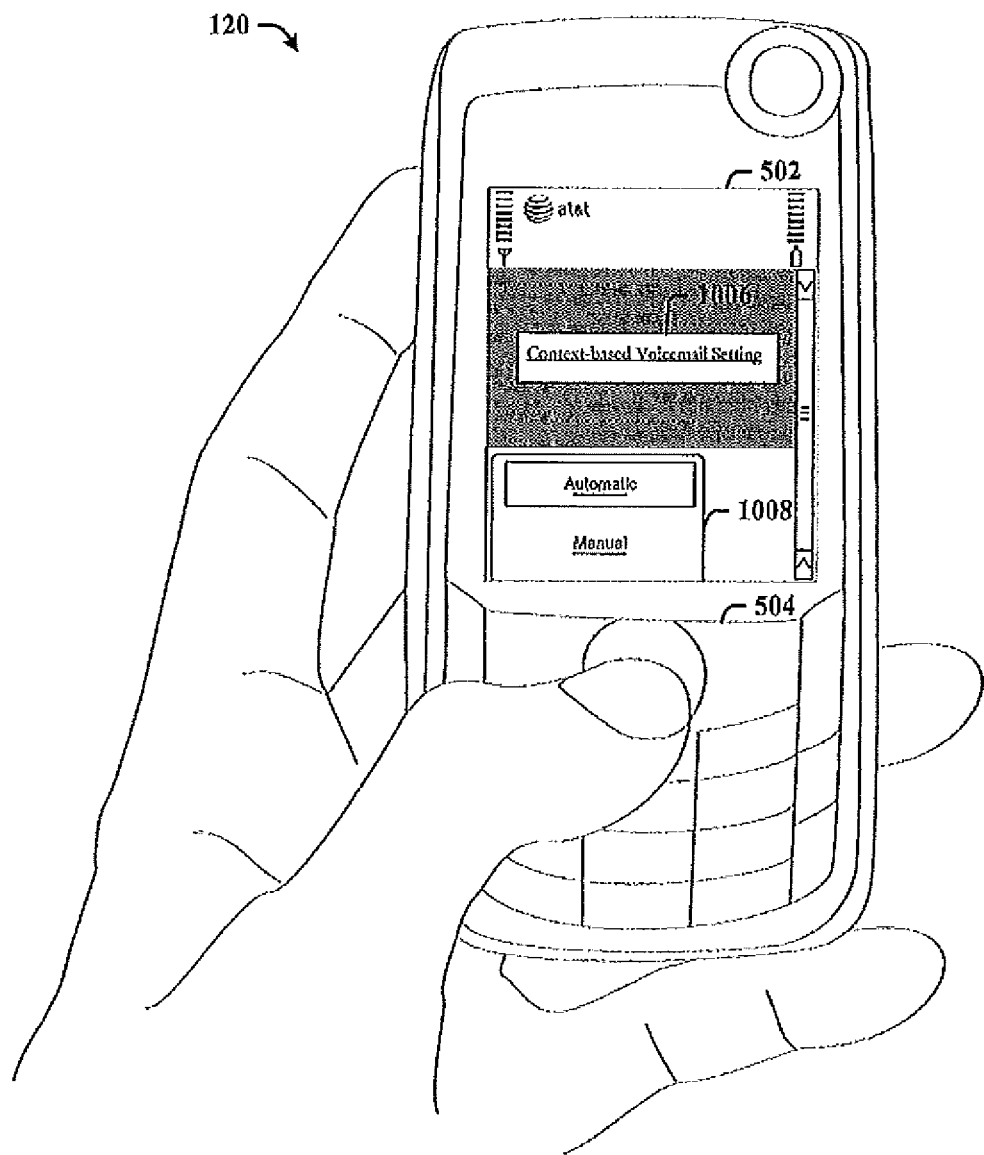

FIGS. 5-9 describe various notifications sent to the MT 120 in response to a context tag change. In each of these examples the user is provided the option to accept or decline a voicemail greeting change corresponding to a context tag change. However, the MT 120 can include a context-based voicemail setting 1006 (FIG. 10) that can be set to an automatic mode or a manual mode via an options menu 1008. The illustrated context-based voicemail setting 1006 is an overall mode selection that affects all context tags and their associated voicemail greeting(s). The context-based voicemail setting 1006 can be extended to each context tag type so that the user can select the voicemail greetings that should be changed based upon a change in context for a particular context tag type. For example, a user may desire location updates to automatically trigger a change in the active voicemail, but may not desire for venue updates to automatically trigger a change in the active voicemail.

Figure 11:
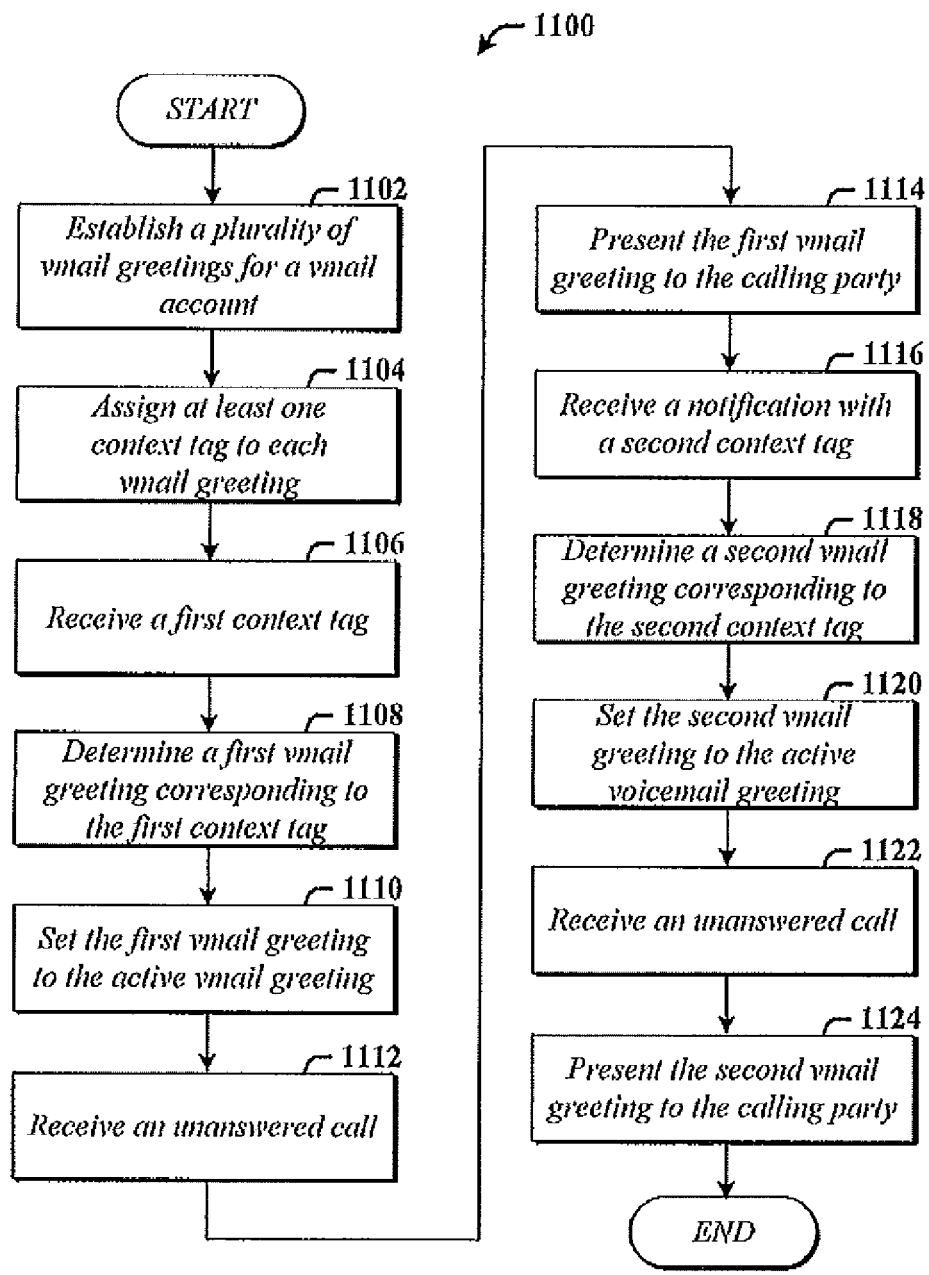
FIG. 11 illustrates a flow diagram of an exemplary method for managing a voicemail system of the present invention.

Referring now to FIG. 11, an exemplary flow diagram is illustrated of a method 1100 for managing a voicemail system, according to the present invention. It should be understood that the illustrated methods are not limited to the steps shown nor the order of the steps shown, and are provided solely as a basis for teaching exemplary embodiments of the present invention. Accordingly, amendments to these methods and/or the addition, elimination, or combination of one or more steps may be made to achieve like results and still be within the scope of the present invention. Moreover, although the method 1100 is described with regard to a location context type, the method 1100 is extensible to any of the context types described herein.

The method 1100 begins and proceeds to step 1102 wherein a plurality of voicemail greeting are established for a voicemail account. Each of the voicemail greeting are assigned at least one context tag in step 1104.

At step 1106 the voicemail system receives a first context tag. For example, suppose the first context tag relates to a first location, Atlanta. The voicemail system can receive the first context tag in a location update or a power-up registration procedure. After receipt of the first context tag, the method 1100 proceeds to step 1108 and a first voicemail greeting is determined. The voicemail system can receive the first context tag and compare it to the greeting field entries corresponding to the Atlanta location. This voicemail greeting can then be set to the active voicemail greeting at step 1110. At step 1112 the voicemail system receives an unanswered call and, the method 1100 proceeds to step 1114, wherein the calling party is presented with the first voicemail greeting.

As the subscriber moves to a second location, New York, for example, a location update or power-up registration procedure notifies the network of the new location and consequently a second context tag notification is generated based upon the new location. The second context tag notification is sent to the voicemail system at step 1116. After receipt of the second context tag, the method 1100 proceeds to step 1118 and a second voicemail greeting is determined. The voicemail system can receive the second context tag and compare it to the greeting field entries corresponding to the New York location. This voicemail greeting is then set to the active voicemail greeting at step 1120. At step 1122 the voicemail system receives an unanswered call and, the method 1100 proceeds to step 1124, wherein the calling party is presented with the second voicemail greeting and the method ends.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A tangible computer-readable storage device, for use in a voicemail system, comprising computer-executable instructions that, when executed by a processor, cause the processor to perform operations comprising:
   receiving, from a context device positioned at a venue, a context message generated by the context device and comprising:
      a subscriber identification associated with a mobile terminal that provided the subscriber identification to the context device, by way of a short-range communication; and a context tag relating to the venue; and
selecting, based on the context tag received, from the context device positioned at the venue, with the context message, an applicable voicemail greeting of a plurality of voicemail greetings associated with a voicemail account associated with the subscriber identification of the context message.

2. The tangible computer-readable storage device of claim 1, wherein the operations further comprise associating the plurality of voicemail greetings, associated with the voicemail account, with multiple context tags, each voicemail greeting of the plurality of voicemail greetings being associated with at least one of the multiple context tags.

3. The tangible computer-readable storage device of claim 1, wherein the operations further comprise selecting the voicemail account based upon the subscriber identification received with the context message.

4. The tangible computer-readable storage device of claim 1, wherein the operations further comprise setting the applicable voicemail greeting as an active voicemail greeting for the voicemail account.

5. The tangible computer-readable storage device of claim 4, wherein the operations further comprise:
receiving a call from a calling party; and
presenting the active voicemail greeting to the calling party.

6. The tangible computer-readable storage device of claim 4, wherein:
the context message is a first context message;
the context tag is a first context tag;
the applicable voicemail greeting is a first applicable voicemail greeting; and
the operations further comprise, performing, subsequent to setting the first applicable voicemail greeting as the active voicemail greeting, subsequent operations comprising:
selecting, based on a second context tag received with a second context message, a second applicable voicemail greeting of the plurality of voicemail greetings; and
setting the second applicable voicemail greeting as the active voicemail greeting, in place of the first applicable voicemail greeting, for the voicemail account.

7. The tangible computer-readable storage device of claim 6, wherein the subsequent operations further comprise:
receiving a call from a calling party; and
presenting the active voicemail greeting, being the second applicable voicemail greeting, to the calling party.

8. The tangible computer-readable storage device of claim 6, wherein the second context tag includes at least one characteristic selected from a group of characteristics consisting of:
a device parameter; and
a network parameter.

9. The tangible computer-readable storage device of claim 1, wherein the context tag includes at least one characteristic selected from a group of characteristics consisting of:
a device parameter; and
a network parameter.

10. The voicemail system of claim 1, wherein the context tag indicates at least one characteristic selected from a group of characteristics consisting of:
a primary location of the venue;
a secondary location of the venue;
a name of the venue;
an address of the venue;
a date of an event at the venue;
a time of the event at the venue; and
a length of the event at the venue.

11. The tangible computer-readable storage device of claim 10, wherein the secondary location of the venue is a location within the venue.

12. A voicemail system, comprising:
a processor; and
a computer-readable medium comprising computer-executable instructions that, when executed by the processor, cause the processor to perform operations comprising:
receiving, from a context device positioned at a venue, a context message generated by the context device and comprising:
a subscriber identification associated with a mobile terminal that provided the subscriber identification to the context device, by way of a short-range communication; and
a context tag relating to the venue; and
selecting, based on the context tag received, from the context device positioned at the venue, with the context message, an applicable voicemail greeting of a plurality of voicemail greetings associated with a voicemail account associated with the subscriber identification of the context message.

13. The voicemail system of claim 12, wherein the operations further comprise associating the plurality of voicemail greetings, associated with the voicemail account, with multiple context tags, each voicemail greeting of the plurality of voicemail greetings being associated with at least one of the multiple context tags.

14. The voicemail system of claim 12, wherein the operations further comprise setting the applicable voicemail greeting as an active voicemail greeting for the voicemail account.

15. The voicemail system of claim 14, wherein:
the context message is a first context message;
the context tag is a first context tag;
the applicable voicemail greeting is a first applicable voicemail greeting; and
the operations further comprise, performing, subsequent to setting the first applicable voicemail greeting as the active voicemail greeting, subsequent operations comprising:
selecting, based on as second context tag received with a second context message, a second applicable voicemail greeting of the plurality of voicemail greetings; and
setting the second applicable voicemail greeting as the active voicemail greeting, in place of the first applicable voicemail greeting, for the voicemail account.

16. The voicemail system of claim 15, wherein the second context tag includes at least one characteristic selected from a group of characteristics consisting of:
a device parameter; and
a network parameter.

17. The voicemail system of claim 12, wherein the context tag includes at least one characteristic selected from a group of characteristics consisting of:
a device parameter; and
a network parameter.

18. The voicemail system of claim 12, wherein the context tag indicates at least one characteristic selected from a group of characteristics consisting of:
a primary location of the venue;
a secondary location of the venue;
a name of the venue;
an address of the venue;

a date of an event at the venue;
a time of the event at the venue; and
a length of the event at the venue.

19. A method, for managing a voicemail account, comprising:
- receiving, from a context device positioned at a venue, a context message generated by the context device and comprising:
  - a subscriber identification associated with a mobile terminal that provided the subscriber identification to the context device, by way of a short-range communication; and
  - a context tag relating to the venue; and
- selecting, by a system using a computer processor, based on the context tag received, from the context device positioned at the venue, with the context message, an applicable voicemail greeting of a plurality of voicemail greetings associated with a voicemail account associated with the subscriber identification of the context message.

* * * * *